United States Patent
Roy et al.

(10) Patent No.: US 11,573,851 B2
(45) Date of Patent: Feb. 7, 2023

(54) DATA OF POINT-OF-SALE DEVICES

(71) Applicant: Hewlett-Packard Development Company, L.P., Spring, TX (US)

(72) Inventors: Gaurav Roy, Spring, TX (US); Prateek Tiwari, Pune (IN); Adnan Mirza, Spring, TX (US); Francisco Beschoren da Costa, Spring, TX (US); Binh T. Truong, Spring, TX (US); Shiva Bansal, Pune (IN); Sanket Anavkar, Fort Collins, CO (US); Martin Schwarz, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/262,276

(22) PCT Filed: Feb. 26, 2019

(86) PCT No.: PCT/US2019/019485
§ 371 (c)(1),
(2) Date: Jan. 22, 2021

(87) PCT Pub. No.: WO2020/176074
PCT Pub. Date: Sep. 3, 2020

(65) Prior Publication Data
US 2021/0382782 A1    Dec. 9, 2021

(51) Int. Cl.
*G06F 11/00* (2006.01)
*G06F 11/07* (2006.01)
(Continued)

(52) U.S. Cl.
CPC ...... *G06F 11/0793* (2013.01); *G06F 11/3423* (2013.01); *G06Q 20/204* (2013.01)

(58) Field of Classification Search
CPC ............ G06F 11/0793; G06F 11/3423; G06F 11/0754
See application file for complete search history.

(56) References Cited

U.S. PATENT DOCUMENTS 4,873,631 A * 10/1989 Nathan ................ G06Q 20/202
714/4.1
6,546,294 B1 * 4/2003 Kelsey ............... G05B 23/0283
396/311
(Continued)

FOREIGN PATENT DOCUMENTS

EP            3361434 A1    8/2018
WO     WO-2018013050       1/2018

*Primary Examiner* — Amine Riad
(74) *Attorney, Agent, or Firm* — Quarles & Brady LLP

(57) ABSTRACT

In some examples, a system receives data from peripheral devices connected to respective point-of-sale (POS) base terminals, the data captured using agents executing in the POS base terminals during periods of reduced activity of the POS base terminals. Based on processing the received data, the system determines linkage of peripheral devices to the POS base terminals, and determines, for a first POS base terminal, swapping of a first peripheral device with a second peripheral device. The system generates an output indicating that the first peripheral device has been swapped with the second peripheral device, and identifies an issue associated with a POS base terminal or a peripheral device, and trigger a remediation action to address the issue.

19 Claims, 4 Drawing Sheets

(51) Int. Cl.
*G06F 11/34* (2006.01)
*G06Q 20/20* (2012.01)

(56) References Cited

U.S. PATENT DOCUMENTS

| | | | |
|---|---|---|---|
| 6,785,845 B2 * | 8/2004 | Venkataraman | G07G 1/00 |
| | | | 705/16 |
| 6,947,161 B2 * | 9/2005 | Suyehira | G06Q 10/087 |
| | | | 358/1.9 |
| 7,232,063 B2 | 6/2007 | Fandel et al. | |
| 7,232,963 B2 * | 6/2007 | Leisinger | G01G 21/283 |
| | | | 177/238 |
| 8,078,715 B2 * | 12/2011 | Shively, II | G06F 11/0709 |
| | | | 709/219 |
| 8,693,899 B2 * | 4/2014 | Hymas | G03G 21/1889 |
| | | | 399/24 |
| 8,996,776 B2 * | 3/2015 | Wong | G06F 1/266 |
| | | | 710/302 |
| 9,007,063 B2 * | 4/2015 | Macbeth | G01R 31/14 |
| | | | 324/424 |
| 2004/0181454 A1 | 9/2004 | Manno | |
| 2007/0276763 A1 | 11/2007 | Kleinman et al. | |
| 2009/0037284 A1 | 2/2009 | Lewis et al. | |
| 2011/0185090 A1 | 7/2011 | Kushnir | |
| 2012/0089467 A1 * | 4/2012 | Comparelli | G06Q 20/20 |
| | | | 705/16 |
| 2015/0332239 A1 | 11/2015 | Anderson et al. | |
| 2016/0005018 A1 | 1/2016 | Huang | |
| 2018/0349239 A1 | 12/2018 | Gohil et al. | |
| 2019/0005477 A1 | 1/2019 | Sanders | |

\* cited by examiner

DATA OF POINT-OF-SALE DEVICES

BACKGROUND

A point-of-sale (POS) device can be used in a retail or other setting to scan items and collect payments for the items. The POS device can include a scanner to scan an identifier of an item. The POS device can include a reader to interact with a payment device, such as a credit or debit card, a smartphone or wearable device loaded with a payment application, a smartcard, and so forth.

BRIEF DESCRIPTION OF THE DRAWINGS

Some implementations of the present disclosure are described with respect to the following figures.

Figure 1:
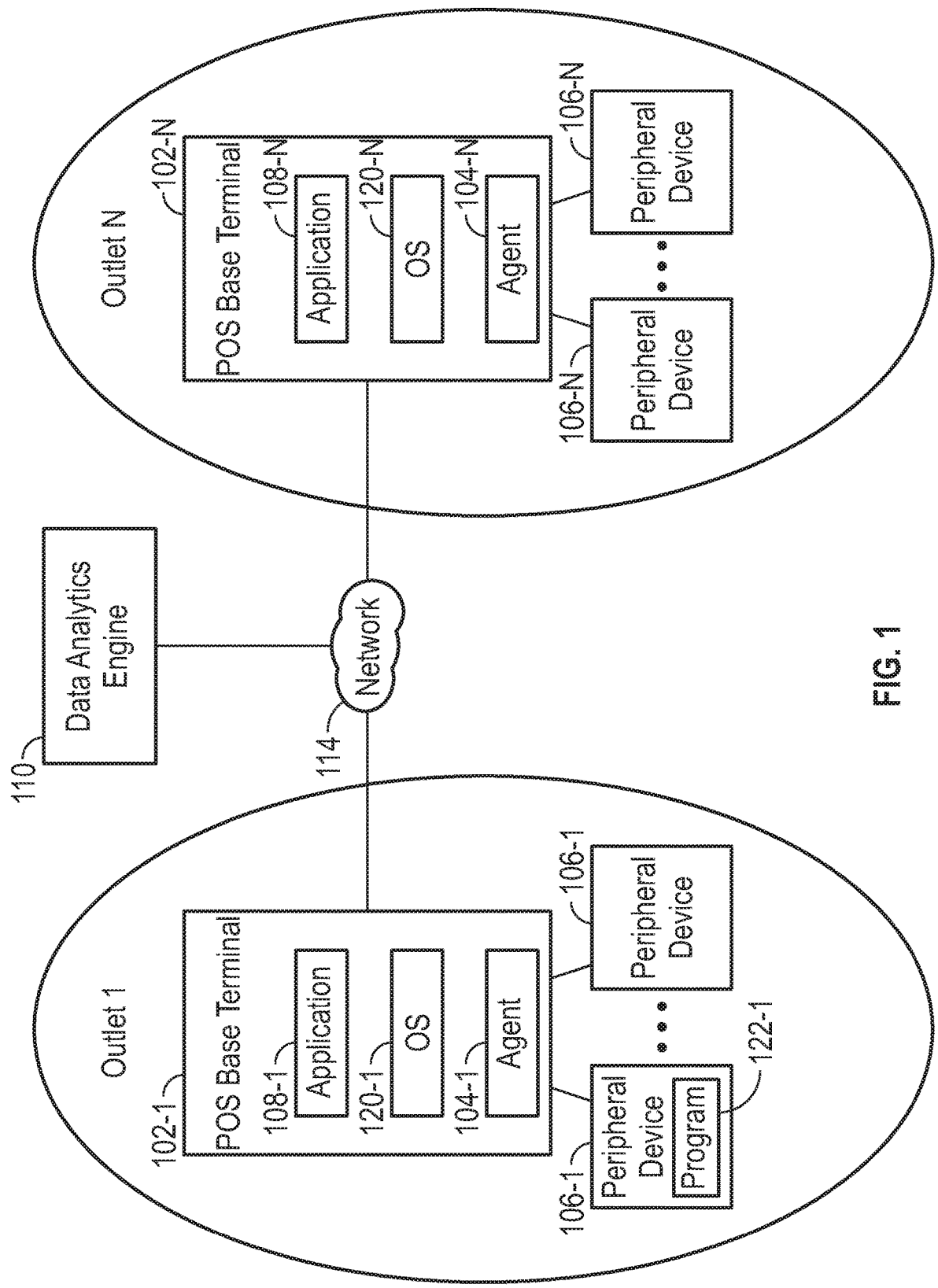
FIG. 1 is a block diagram of an arrangement that includes a point-of-sale (POS) base terminal and peripheral devices connected to the POS base terminal.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

An enterprise such as a retail organization can include a large number of outlets at which customers can purchase items. POS devices can be deployed at the outlets to scan items that are purchased, generate invoices for the items, and collect payments for the items. An "outlet" can refer to a store or any other location at which items can be purchased.

An "item" can refer to a product or a service. Purchasing an item can refer to a customer acquiring the item in return for payment or for any other reason, such as based on a contractual relationship between the customer and the entity offering the item, based on an employment relationship between the customer and the entity offering the item, and so forth.

A POS device can include a base terminal and peripheral devices connected to the base terminal. Examples of peripheral devices include any or some combination of the following: a cash drawer, a magnetic strip reader, a printer, a keyboard, a scanner (such as to scan a barcode, a quick response (QR) code, or other identifier of an item), a display device, a support stand, a camera, a mobile phone, a docking station, a bill acceptor device, a bill dispenser device, a biometrics reader, a cash changer device, a check scanner, a coin acceptor device, a coin dispenser device, an image scanner, a sensor, a keypad, a weight scale, a signature capture device, an audio output device, a smartcard reader, and so forth.

A POS base terminal can act as a controller for POS peripheral devices connected to the POS base terminal. For example, in response to events at the POS base terminal or in response to requests received by the POS base terminal, the POS base terminal can send requests to POS peripheral devices to perform actions. The POS base terminal can also receive data and requests from POS peripheral devices.

A large enterprise can include a large number of POS devices distributed across many outlets. It may be challenging to obtain insights into the inventory of POS devices, status of POS devices, usage of POS devices, potential issues of POS devices, and so forth.

If data from POS devices are collected in an ad hoc manner and processed, pieces of data may be missing which can result in inaccurate or incomplete analytics of the collected data. In addition, any issues that may be present in POS devices may not be identified in a timely fashion, which can lead to downtime or faulty operation of POS devices.

In accordance with some implementations of the present disclosure, as shown in FIG. 1, POS base terminals 102-1 to 102-N (N 2) are deployed at respective outlets 1 to N. The multiple outlets 1 to N may be associated with one enterprise or multiple enterprises. Although FIG. 1 shows multiple POS base terminals 102-1 to 102-N deployed at respective outlets 1 to N, in other examples, just one POS base terminal can be deployed at a corresponding outlet.

Agents 104-1 to 104-N are deployed on the respective POS base terminals 102-1 to 102-N. Each agent 104-$i$ ($i=1$ to N) can be implemented as a hardware processing circuit or as machine-readable instructions executable on the POS base terminal 102-$i$.

Each agent 104-$i$ collects data of the respective POS base terminal 102-$i$, as well as peripheral devices 106-$i$ connected to the respective POS base terminal 102-$i$. In the example of FIG. 1, peripheral devices 106-1 are connected to the POS base terminal 102-1, and peripheral devices 106-N are connected to the POS base terminal 102-N. A peripheral device can be connected over a wired medium or a wireless medium to the corresponding POS base terminal.

A POS base terminal 102-$i$ can run a respective application 108-$i$ ($i=1$ to N), which can be an application of the enterprise that sells items in respective outlets, or an application of another entity. As examples, the application 108-$i$ can be an application that controls the scanning of items, generation of invoices, acquisition of payment information to effect payment for the items, and so forth.

Data of a POS device acquired by each agent 104-$i$ can include data acquired from a program running in the POS device (e.g., a POS base terminal or a POS peripheral device), from a sensor of the POS device, from a memory of the POS device, or from any other source of data associated with the POS device.

In accordance with some implementations, to acquire data of the POS base terminals 102-1 to 102-N and/or the peripheral devices 106-1 to 106-N, the application 108-$i$ in each POS base terminal 102-$i$ can be disabled, such as at a scheduled time or in response to another event, and the respective agent 104-$i$ in the POS base terminal 102-$i$ can perform data acquisition. While the application 108-$i$ is disabled, the respective agent 104-$i$ can acquire data of a POS device. Disabling the applications 108-1 to 108-N during acquisition of data by the respective agents 104-1 to 104-N can protect sensitive financial data (or other data)

collected from POS peripheral devices and/or POS base terminals from being exposed to the respective applications.

More generally, the agent 104-i in the corresponding POS base terminal 102-i can acquire data of the POS device (e.g., the POS base terminal 102-i and/or the peripheral devices 106-i connected to the POS base terminal 102-i) during a period of reduced activity of the POS base terminal 102-i. The period of reduced activity can be due to the application 108-i being disabled (i.e., stopped), or alternatively, during periods when the application 108-i is not actively performing tasks of the application 108-i or during periods where a processing resource of the POS base terminal 102-i is available. A "processing resource" can refer to a processor or a portion of a processor.

The agent 104-i in each POS base terminal 102-i can transmit the collected data over a network 112 to a data analytics engine 110, which can be located in a server(s), cloud system, or any other computing platform. The data analytics engine 110 can apply analytics on the collected data to produce various analytics insights. The network 112 can include a public network, a local area network (LAN), a wide area network (WLAN), and so forth.

As used here, an "engine" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

As further shown in FIG. 1, a POS base terminal 102-i can run an advanced operating system (OS) 120-i (i=1 to N), such as a Windows OS, a Linux OS, an Android OS, and so forth. A peripheral device 106-i can run a basic OS with reduced features (as compared to the features available from the advanced OS 120-i). In further examples, the peripheral device 106-i may run just firmware (including machine-readable instructions), and may not include an OS.

More generally, FIG. 1 shows a program 122-1 running in a peripheral device 106-1. The program 122-1 can include a basic OS, a firmware, or any other type of machine-readable instructions. The other peripheral device(s) 106-1 and the peripheral devices 106-N include similar programs.

The program 122-1 on the peripheral device 106-1 can communicate with the POS base terminal 102-1. For example, the program 122-1 can send a response to the POS base terminal 102 in response to a request from the POS base terminal 102-1 to the peripheral device 106-1. As another example, the program 122-1 can send a request or a command to the POS base terminal 102-1.

A POS peripheral device 106-i connected to a POS base terminal 102-i can be swapped, by disconnecting an existing peripheral device 106-i and re-connecting another peripheral device to the POS base terminal 102-i. As examples, swapping a peripheral device may be performed to service an existing peripheral device that is experiencing a fault, to replace an existing peripheral device that has reached or is about to reach end of life of the existing peripheral device, or for any other reason. In some examples, swapping an existing peripheral device with a replacement peripheral device can be performed while the POS base terminal 102-i remains powered. In such examples, the swapping of peripheral devices is referred to as hot-swapping peripheral devices.

Analytics that can be performed by the data analytics engine 110 include any or some combination of the following: determining locations of POS devices, determining an inventory of POS devices, determining links of POS peripheral devices to base terminals, determining usage statistics of POS devices, determining remaining warranties of POS devices, determining life expectancies of POS devices, determining uptimes of POS devices, determining swapping of POS peripheral devices with respect to POS base terminals, and so forth.

The analytic insights provided by the data analytics engine 110 can be used for any or some combination of the following, as examples: inventory and supply chain management, identifying unused POS peripheral devices and/or POS base terminals, performing security management regarding POS peripheral devices that have been swapped, predicting end of life of POS devices due to usage or wear and tear, and so forth.

At a retail outlet, it may be desirable to predict when a peripheral device may no longer function due to length of time in use, or based on performance metrics collected from the peripheral devices. If a peripheral device is about to experience a fault, or is predicted to experience a fault, then the data analytics engine 110 can provide an alert to cause the peripheral device or base terminal to be swapped or replaced.

The data analytics engine 110 can produce reports containing various analytics results on a periodic basis (e.g., monthly reports, weekly reports, yearly reports, and so forth). The data analytics engine 110 can also produce information regarding incidents that have occurred or are predicted to occur at POS devices. The data analytics engine 110 can also provide information regarding remediation actions to be taken, or alternatively, the data analytics engine 110 can automatically perform a corresponding remediation action.

An agent 104-i is able to collect data from POS peripheral devices using peripheral specific input/output (I/O) protocols, such as a Universal Serial Bus (USB) protocol, a High-Definition Multimedia Interface (HDMI) protocol, a storage interface protocol, a serial I/O protocol, and so forth.

In some examples, an agent 104-i can be divided into two sub-agents, including a generic agent and a peripheral agent. The peripheral agent is responsible for communicating with and collecting data from peripheral devices, and for sending the collected data to the generic agent. The generic agent can perform transmission of information to the data analytics engine 110 over the network 112.

In some examples where a generic agent and a peripheral agent are provided at each POS base terminal, the generic agent can be kept generic and deployable on a large variety of POS base terminals, while the peripheral agents installed can be specific for peripheral devices connected to the POS base terminal.

Figure 2:
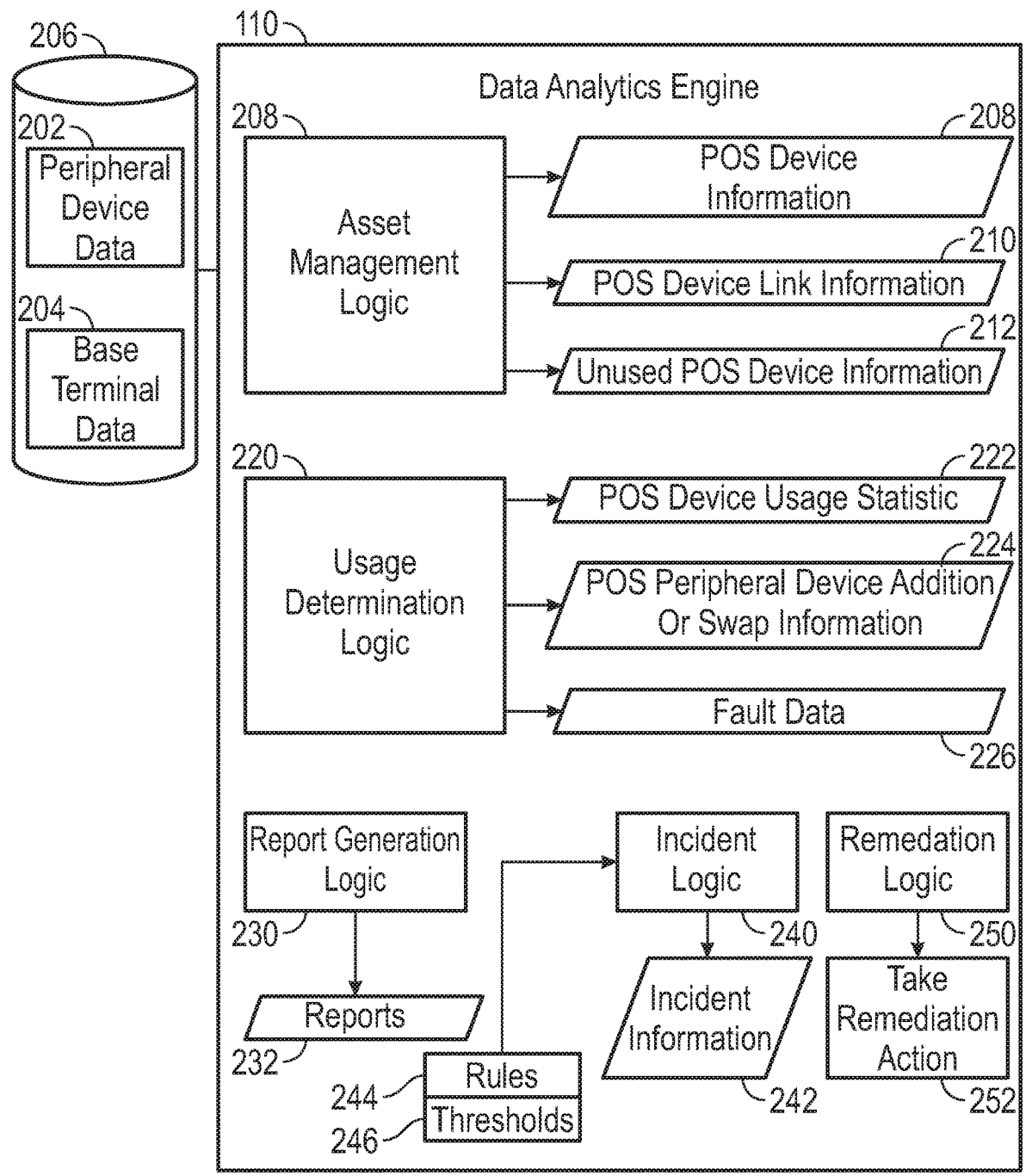
FIG. 2 is a block diagram of data analytics engine according to some examples.

FIG. 2 is a block diagram of example components that can be included in the data analytics engine 110. Data acquired by agents 104-1 to 104-N executing in the POS base terminals 102-1 to 102-N can be stored as peripheral device data 202 (data acquired from POS peripheral devices) and as base terminal data 204 (data acquired from POS base terminals).

The peripheral device data 202 and the base terminal data 204 provided by the agents 104-1 to 104-N can be stored in a data repository 206, which can be stored in a storage device or multiple storage devices. A "storage device" can refer to a persistent storage device (e.g., a disk-based storage device or a solid state drive) and/or a volatile memory device (e.g., a dynamic random access memory (DRAM) device, a static random access memory (SRAM) device, etc.).

The peripheral device data 202 and the base terminal data 204 stored in the data repository 206 are accessible by various logic of the data analytics engine 110. A "logic" of the data analytics engine 110 can refer to a portion of the hardware processing circuit of the data analytics engine 110 or machine-readable instructions executable on the data analytics engine 110.

The data analytics engine 110 includes an asset management logic 208 that is able to, based on the peripheral device data 202 and the base terminal data 204, determine an inventory of POS devices (a "POS device" includes a POS peripheral device or a POS base terminal) and determine relationships between POS base terminals and POS peripheral devices.

For example, the asset management logic 208 is able to produce POS device information 210, POS device link information 212 describing which POS peripheral devices are connected to which POS base terminals, unused POS device information 214 that identifies which POS devices are not being used or are not in operation, and so forth.

The POS device information 210 can include identifiers of POS peripheral devices and identifiers of POS base terminals, models of the respective POS devices, the configurations of the POS devices, the status of the respective POS devices, POS device location information identifying locations (e.g., geographic locations, outlet identifiers, etc.) at which the POS devices are located, and so forth.

Although FIG. 2 shows the POS device information 210, the POS device link information 212, and the unused POS device information 214 in separate blocks, it is noted that in other examples, the different pieces of information can be stored together, such as in a table or database.

The data analytics engine 110 also includes a usage determination logic 220 that can determine, based on the peripheral device data 202 and the base terminal data 204, POS device usage statistics 222, including usage statistics of POS base terminals and of POS peripheral devices. Usage statistics can include information pertaining to how long a POS device is on, how long the POS device is off, a number of times the POS device was rebooted or restarted, a number of transactions processed by the POS device, a length of time of each transaction, transaction failures experienced by a POS device, life remaining for a POS device, and so forth.

The usage determination logic 220 can determine, based on the peripheral device data 202 and the base terminal data 204, POS peripheral device addition or swap information 224, which can describe which POS peripheral devices were swapped or newly added, and the times at which the POS peripheral devices were swapped or newly added. The swapping of POS peripheral devices and/or the addition of new POS peripheral devices can affect the POS device link information 210. Swapping or adding a POS peripheral device can change which POS peripheral device is connected to a POS base terminal.

The usage determination logic 220 can also determine, based on the peripheral device data 202 and the base terminal data 204, fault data 226 associated with POS devices. The agents 104-1 to 104-N may receive information identifying faults during operation of POS peripheral devices and/or POS base terminals.

The data analytics engine 110 includes a report generation logic 230 that is able to produce various reports based on the peripheral device data 202 and the base terminal data 204, and also on the outputs from the asset management logic 208 and the usage determination logic 220. Examples of reports that can be generated include any or some combination: an inventory report listing POS devices, a connectivity report describing connections of POS peripheral devices to POS devices, connectivity change reports describing POS peripheral devices that have been swapped or added, a usage report including usage statistics for POS devices (including how long each POS device was used, an uptime of a POS device, a downtime of a POS device), an unused POS device report identifying POS devices that are unused, a fault report that identifies faults of POS devices, and so forth.

The reports 232 can be sent to target recipients, such as users, programs, and/or machines.

The data analytics engine 110 further includes an incident logic 240, which produces incident information 242 in response to detected incidents, based on rules 244 and thresholds 246 received by the incident logic 240. The incident information 242 can include life expectancy incident information. For example, if a certain POS device is about to reach an end of life based on usage of the POS device (e.g., based on the amount of time the POS device has been used since the POS device was deployed or last serviced), the incident logic 240 can generate an incident indication indicating that the POS device is about to reach end of life (and possibly including information regarding how much time is left before the POS device reaches end of life). The determination that a POS device is about to reach end of life can be based on comparing usage time of the POS device to a specified threshold or based on a rule, for example.

If the end of life incident indication is generated, then a remediation logic 250 may be triggered. For example, the incident logic 240 can send the end of life incident indication to the remediation logic 250, which triggers the remediation logic 250 to take a remediation action (252) to address the end of life incident. For example, the remediation logic 250 can trigger a workflow to ship a new POS peripheral device to the corresponding outlet. Alternatively, the remediation logic 250 can issue a request to the respective POS base terminal to cause deactivation or other action to be performed with respect to the POS peripheral device that is experiencing end of life.

In some examples, the threshold 246 relating to end of life can be adjusted based on machine learning, such as based on feedback indicating whether or not the end of life indication produced by the incident logic 240 is accurate.

Another incident that can be generated by the incident logic 240 is an over-utilization indication. The incident logic 240 can track a usage time of a POS device. If the tracked usage time exceeds a threshold or violates a rule, then that is an indication that the POS device is being over-utilized, and the over-utilization indication can be generated.

The over-utilization indication can trigger the remediation logic 250 to take a remediation action (252), such as to initiate a workflow to obtain a new POS peripheral device, or to cause the POS peripheral device to be shut down or to reduce activity of the POS peripheral device.

Another incident indication that can be generated by the incident logic 240 is an incident indicating that a POS device is unused. The POS device unused incident indication can trigger the remediation logic 250 to take a remediation action (252) to address the unused POS device, such as to start (e.g., power on, reboot, etc.) the unused POS device, or send an alert to a user to have the user investigate why the POS device is not being used even though the POS device is connected in the system (e.g., an unused POS peripheral device is connected to a POS base terminal).

A further remediation action (252) that can be performed by the remediation logic 250 includes performing a security task with respect to a POS peripheral device that has been swapped or added. A security task can include authenticating the POS peripheral device, scanning the POS peripheral device for malware, verifying that the POS peripheral device is functioning according to a target specification, and so forth.

Figure 3:
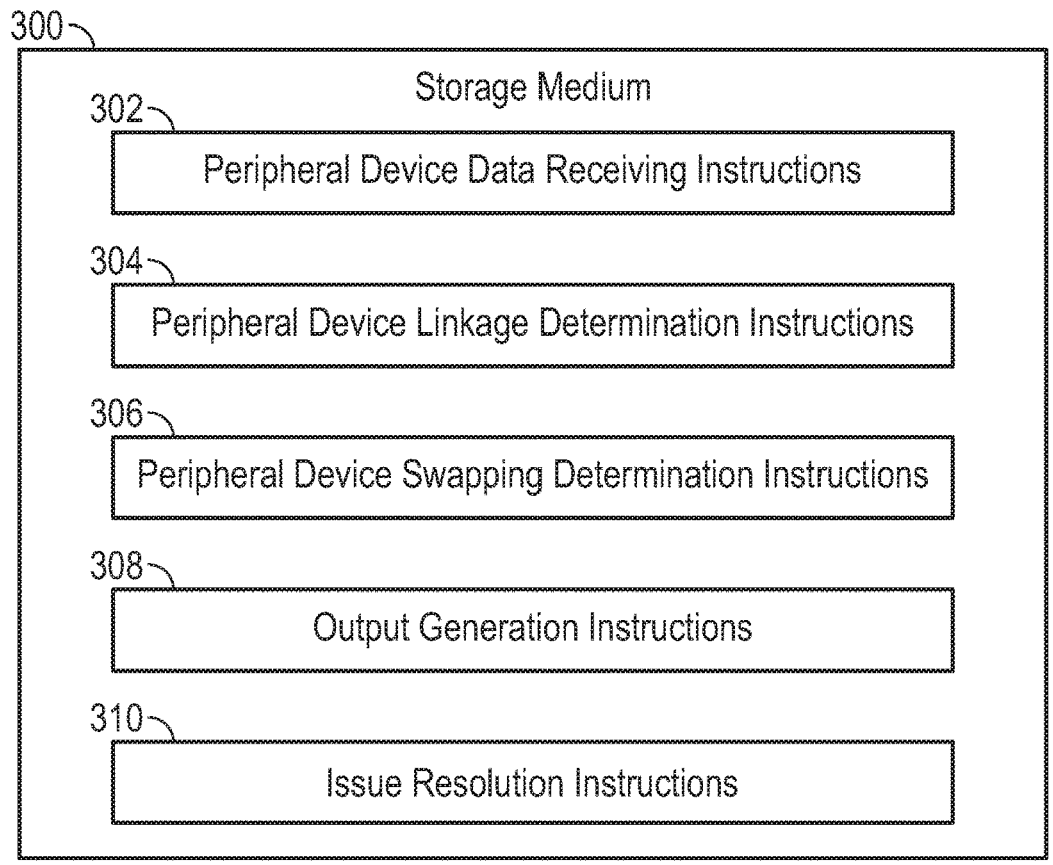
FIG. 3 is a block diagram of a storage medium storing machine-readable instructions according to some examples.

FIG. 3 is a block diagram of a non-transitory machine-readable or computer-readable storage medium 300 storing machine-readable instructions that upon execution cause a system to perform various tasks. The machine-readable instructions include peripheral device data receiving instructions 302 to receive data from peripheral devices connected to respective POS base terminals, the data captured using agents executing in the POS base terminals during periods of reduced activity of the POS base terminals.

The machine-readable instructions include peripheral device linkage determination instructions 304 to, based on processing the received data, determine linkage of peripheral devices to the POS base terminals.

The machine-readable instructions include peripheral device swapping determination instructions 306 to, based on processing the received data, determine, for a first POS base terminal, swapping of a first peripheral device with a second peripheral device.

The machine-readable instructions include output generation instructions 308 to generate an output indicating that the first peripheral device has been swapped with the second peripheral device.

The machine-readable instructions include issue resolution instructions 310 to identify an issue associated with a POS base terminal or a peripheral device, and trigger a remediation action to address the issue (e.g., over-utilization of the peripheral device, fault of the peripheral device, end of life of the peripheral device, etc.).

Figure 4:
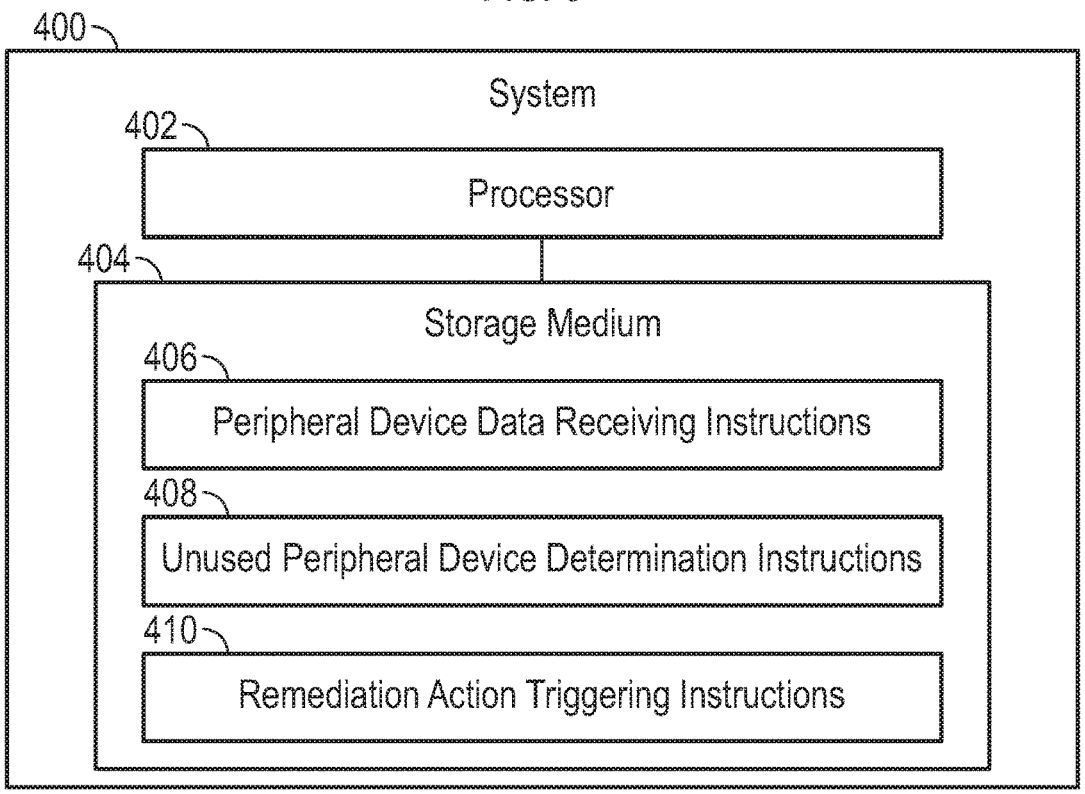
FIG. 4 is a block diagram of a system according to some examples.

FIG. 4 is a block diagram of a system 400 that includes a hardware processor 402 (or multiple hardware processors. A hardware processor can include a microprocessor, a core of a multi-core microprocessor, a microcontroller, a programmable integrated circuit, a programmable gate array, a digital signal processor, or another hardware processing circuit.

The system 400 incudes a storage medium 404 storing machine-readable instructions executable on the hardware processor 402 to perform various tasks. Machine-readable instructions executable on a hardware processor can refer to the instructions executable on a single hardware processor or the instructions executable on multiple hardware processors.

The machine-readable instructions include peripheral device data receiving instructions 406 to receive data from peripheral devices connected to respective POS base terminals, the data captured using agents executed in the POS base terminals during periods of reduced activity of the POS base terminals.

The machine-readable instructions include unused peripheral device determination instructions 408 to, based on processing the received data, determine that a peripheral device is unused.

The machine-readable instructions further include remediation action triggering instructions 410 to trigger a remediation action to address the peripheral device that is unused.

Figure 5:
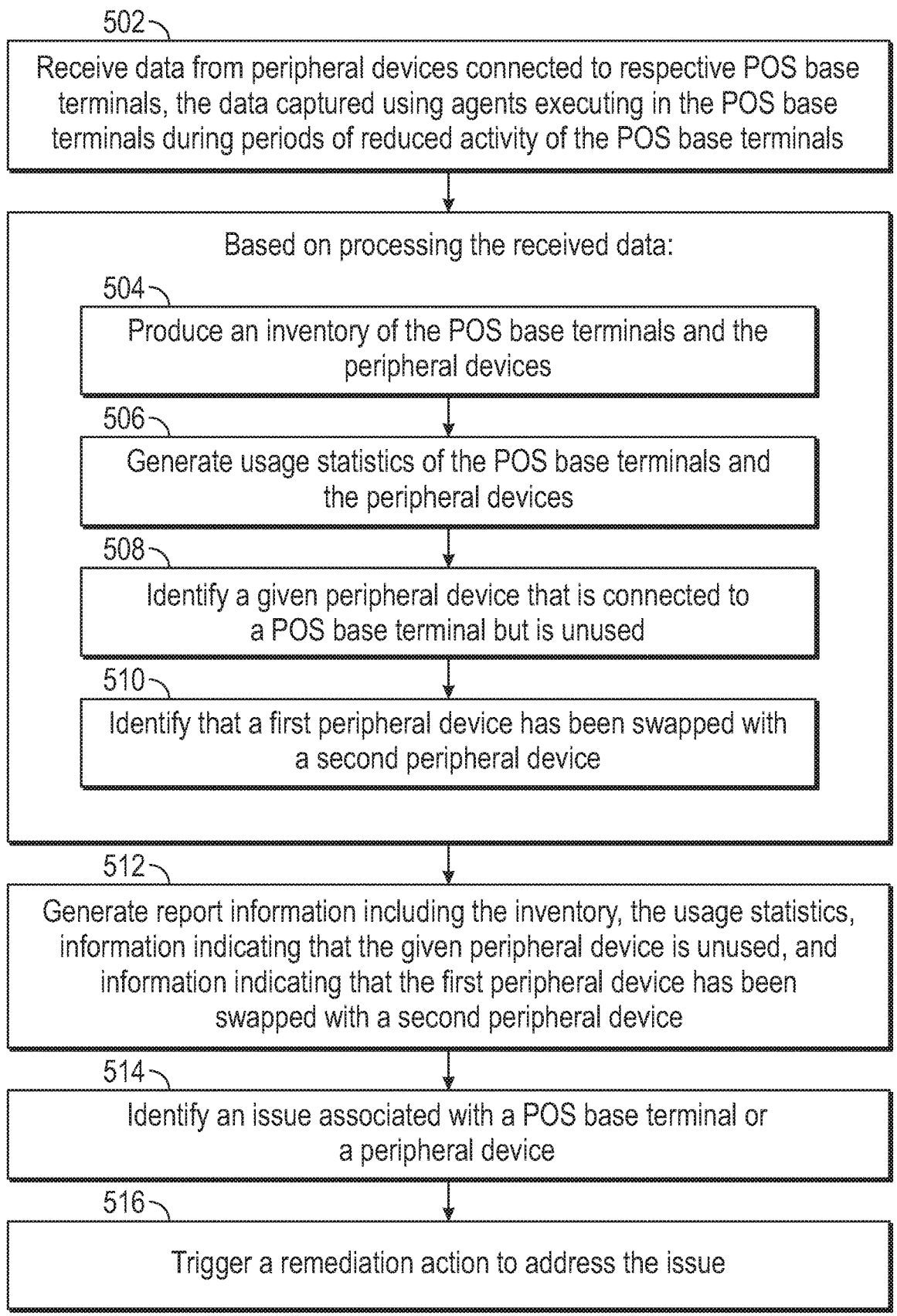
FIG. 5 is a flow diagram of a process according to some examples.

FIG. 5 is a flow diagram of a process according to some examples. The process includes receiving (at 502) data from peripheral devices connected to respective POS base terminals, the data captured using agents executing in the POS base terminals during periods of reduced activity of the POS base terminals.

Based on processing the received data, the process includes producing (at 504) an inventory of the POS base terminals and the peripheral devices, generating (at 506) usage statistics of the POS base terminals and the peripheral devices, identifying (at 508) a given peripheral device that is connected to a POS base terminal but is unused, and identifying (at 510) that a first peripheral device has been swapped with a second peripheral device.

The process includes generating (at 512) report information including the inventory, the usage statistics, information indicating that the given peripheral device is unused, and information indicating that the first peripheral device has been swapped with a second peripheral device.

The process includes identifying (at 514) an issue associated with a POS base terminal or a peripheral device, and triggering (at 516) a remediation action to address the issue.

A storage medium (e.g., 300 in FIG. 3 or 404 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
   receive data from peripheral devices connected to respective point-of-sale (POS) base terminals, the data captured using agents executing in the POS base terminals during periods of reduced activity of the POS base terminals;
   based on processing the received data, determine linkage of the peripheral devices to the POS base terminals, and determine, for a first POS base terminal, swapping of a first peripheral device with a second peripheral device;
   perform a security task with respect to the second peripheral device in response to determining that the first peripheral device has been swapped with the second peripheral device, the security task comprising authenticating the second peripheral device and scanning the second peripheral device for malware; and
   identify an issue associated with a POS base terminal or a peripheral device, and trigger a remediation action to address the issue.

2. The non-transitory machine-readable storage medium of claim 1, wherein the first peripheral device has been swapped with the second peripheral device if the first peripheral device is disconnected from a given POS base terminal, and the second peripheral device is connected to the given POS base terminal after disconnection of the first peripheral device.

3. The non-transitory machine-readable storage medium of claim 1, wherein the swapping of the first peripheral device with the second peripheral device comprises a hot-swapping of peripheral devices.

4. The non-transitory machine-readable storage medium of claim 1, wherein the periods of reduced activity comprise a period when an application of a POS base terminal is disabled.

5. The non-transitory machine-readable storage medium of claim 1, wherein the instructions that-upon execution cause the system to:
  determine that a given peripheral device is approaching end of life based on an end of life threshold; and
  in response to the determining that the given peripheral device is approaching end of life, perform a remediation action with respect to the given peripheral device.

6. The non-transitory machine-readable storage medium of claim 5, wherein the instructions upon execution cause the system to:
  adjust the end of life threshold using machine learning.

7. The non-transitory machine-readable storage medium of claim 1, wherein the instructions upon execution cause the system to:
  determine that a given peripheral device is over-utilized based on determining that a usage time of the given peripheral device exceeds a threshold; and
  in response to determining that the given peripheral device is over-utilized, perform a remediation action with respect to the given peripheral device.

8. The non-transitory machine-readable storage medium of claim 1, wherein the instructions upon execution cause the system to:
  based on processing the received data, identify an unused peripheral device.

9. The non-transitory machine-readable storage medium of claim 8, wherein the instructions upon execution cause the system to:
  in response to the identifying of the unused peripheral device, start the unused peripheral device.

10. The non-transitory machine-readable storage medium of claim 1, wherein the instructions upon execution cause the system to:
  based on processing the received data, identify locations of the POS base terminals and the peripheral devices.

11. The non-transitory machine-readable storage medium of claim 1, wherein the instructions upon execution cause the system to:
  based on processing the received data, determine usage statistics associated with each of the POS base terminals and the peripheral devices, wherein the usage statistics include a number of transactions and a length of each of the transactions.

12. The non-transitory machine-readable storage medium of claim 1, wherein the instructions upon execution cause the system to:
  based on processing the received data, determine an amount of uptime and an amount of downtime of a POS base terminal or a peripheral device.

13. A system comprising:
  a processor; and
  a non-transitory storage medium storing instructions executable on the processor to:
    receive data from peripheral devices connected to respective point-of-sale (POS) base terminals, the data captured using agents executed in the POS base terminals during periods of reduced activity of the POS base terminals;
    based on processing the received data, determine that a peripheral device is unused, and determine, for a first POS base terminal, swapping of a first peripheral device with a second peripheral device;
    perform a security task with respect to the second peripheral device in response to determining that the first peripheral device has been swapped with the second peripheral device, the security task comprising authenticating the second peripheral device and scanning the second peripheral device for malware; and
    trigger a remediation action to address the peripheral device that is unused.

14. The system of claim 13, wherein the instructions are executable on the processor to:
  based on processing the received data, determine connections of the peripheral devices to the POS base terminals; and
  generate a report relating to the connections of the peripheral devices to the POS base terminals.

15. The system of claim 13, wherein the instructions are executable on the processor to:
  determine that a given peripheral device is approaching end of life based on an end of life threshold; and
  in response to the determining that the given peripheral device is approaching end of life, perform a remediation action with respect to the given peripheral device.

16. The system of claim 15, wherein the instructions are executable on the processor to:
  adjust the end of life threshold using machine learning.

17. A method performed by a system comprising a hardware processor, comprising:
  receiving data from peripheral devices connected to respective point-of-sale (POS) base terminals, the data captured using agents executing in the POS base terminals during periods of reduced activity of the POS base terminals;
  based on processing the received data:
    producing an inventory of the POS base terminals and the peripheral devices,
    generating usage statistics of the POS base terminals and the peripheral devices,
    identifying a given peripheral device that is connected to a POS base terminal but is unused, and
    identifying that a first peripheral device has been swapped with a second peripheral device;
  performing a security task with respect to the second peripheral device in response to determining that the first peripheral device has been swapped with the second peripheral device, the security task comprising authenticating the second peripheral device and scanning the second peripheral device for malware; and
  generating report information including the inventory, the usage statistics, information indicating that the given peripheral device is unused, and information indicating that the first peripheral device has been swapped with a second peripheral device; and
  identifying an issue associated with a POS base terminal or a peripheral device, and trigger a remediation action to address the issue.

18. The method of claim 17, further comprising:
determining, by the system, that a given peripheral device is approaching end of life based on an end of life threshold; and
in response to the determining that the given peripheral device is approaching end of life, performing, by the system, a remediation action with respect to the given peripheral device.

19. The method of claim 18, further comprising:
adjusting the end of life threshold using machine learning.

* * * * *